Jan. 17, 1967   E. L. GROFF   3,298,607
INSULATED RAIL JOINT
Filed May 16, 1966
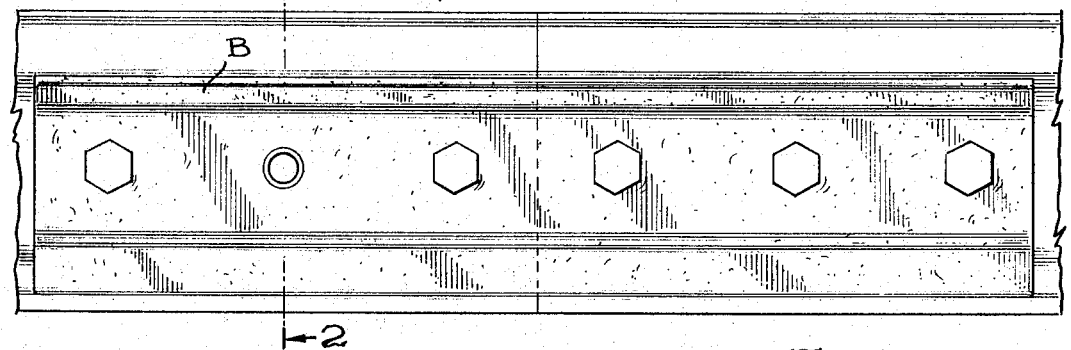
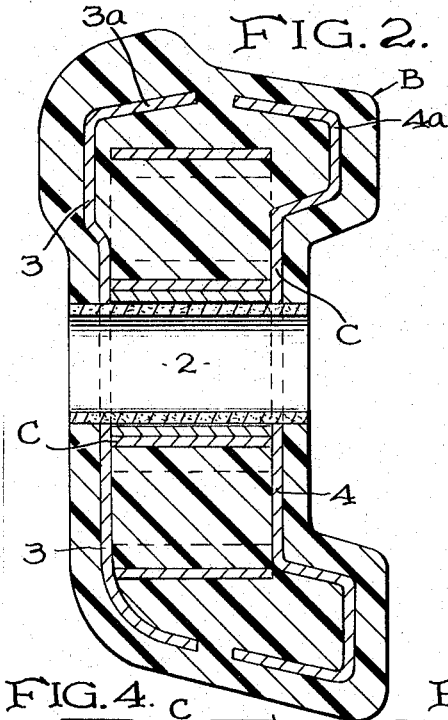
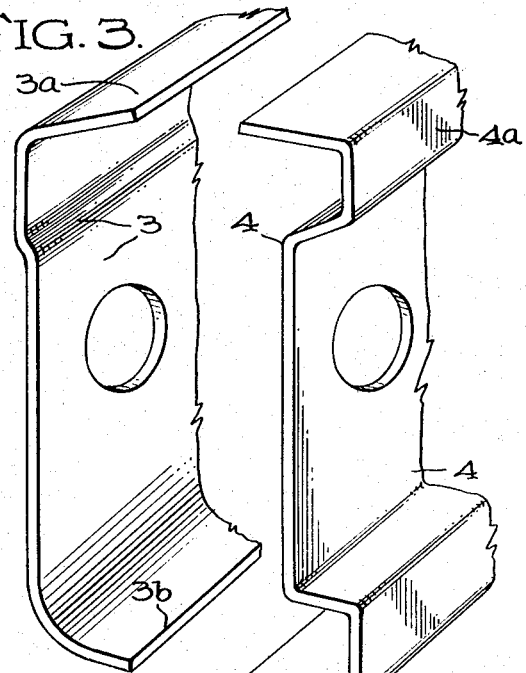
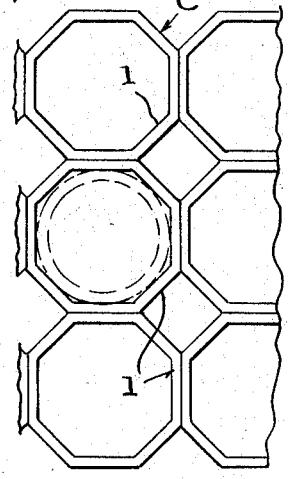
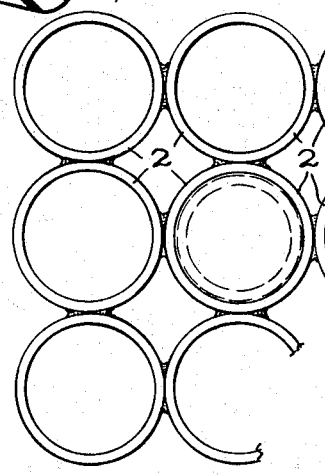
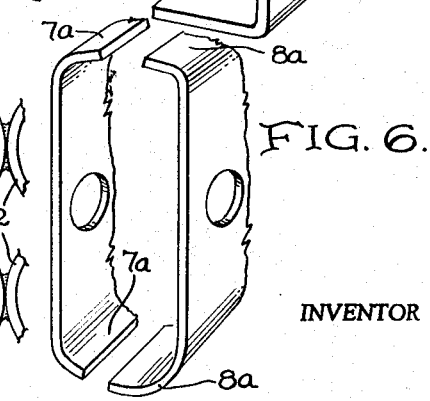
INVENTOR
EMORY L. GROFF

United States Patent Office 3,298,607
Patented Jan. 17, 1967

3,298,607
INSULATED RAIL JOINT
Emory L. Groff, Pompano Beach, Fla., assignor, by mesne assignments, to Poor & Company, Chicago, Ill., a corporation of Delaware
Filed May 16, 1966, Ser. No. 550,446
8 Claims. (Cl. 238—243)

This invention relates to reinforced plastic insulated rail joints.

A primary object of the invention is to provide a structure which while comparatively light provides maximum strength in the zone of the bolt holes. As generally known, joint bars function as beams which fit into the fishing spaces of the meeting rail ends and are intended to rigidly unite them in a manner to closely approximate the bending curve of the rails between their ends. In other words, the most efficient rail joints unite rail ends in a manner to insure minimum relative movement between them and the abutting rail ends under the wave motion imparted to the track by rolling wheel loads.

Another object is to provide a cellular core with the axes of the cells disposed parallel to the line of the clamping force of the bolts. These cells may be of honeycomb, or other transversely disposed tubular elements having their outer surfaces preferably in contact and bonded together with a thermoplastic resin. Regardless of the cross-sectional shape, they may be of a diameter to receive non-metallic insulation members at bolt hole locations to facilitate assembly, and may be longer in diameter than the metal cell, if desired, to receive a moldable insulating medium thereabout.

A further object is to encase the opposite faces of the core by suitable metal plates to better distribute bolt pressure to the entire bar. These plates may also be formed at the top or edge portions, or both, to provide a molding base for head and foot portions or flanges of the bar. This feature lends itself to providing a calculated section modulus to the bar to simulate as closely at possible a metal bar of a cross section to fit a given weight rail and its physical properties. This feature provides, for the first time, the manufacture of an insulated joint whose beam characteristics, as distinguished from a non-metallic bar whose cross-sectional profile is merely a wedge, to fit into the fishing space of the rail ends.

A still further object of the invention is to facilitate the manufacture of one-piece insulated rail joints to avoid the use of separate pieces of hard fibre insulation with metal bars, while at the same time providing maximum insulating qualities.

A preferred and practical embodiment of the invention is shown in the accompanying drawing, in which:

FIG. 1 is a side elevation of the improved insulated rail joint bar.

FIG. 2 is a vertical cross section taken on the line 2—2 of FIG. 1, illustrating the cellular core which is preferably filled with a thermosetting synthetic resin adapted to bond metal to metal.

FIG. 3 is a fragmentary detail perspective view of a preferred pair of cover plates which may be used to envelop the core, and, in turn, be encapsulated with a moldable insulating material.

FIG. 4 is a fragmentary perspective view of one form of cellular grid type core, namely, one having honeycomb cross-section, to be encased, for example, by the plates shown in FIG. 3.

FIG. 5 is a detail view of another equally efficient form of grid made from annular tubular members to provide circular cells.

FIG. 6 is a fragmentary perspective view of simplified core embracing plates whose opposite edge portions are formed to extend toward each other into the top and bottom flange portions of the non-metallic plastic cover which forms the outer surface of the bar.

Similar reference characters designate corresponding parts throughout the several figures of the drawings.

From FIG. 1, it will be seen that the entire outer surface of the bar B is formed by a layer of synthetic resin insulation which is supported by a cellular inner reinforcing core C, for example polyurethane.

The core C is in the form of a grid, for example, of honeycomb or other formation, with the axes and walls of the cells disposed horizontally, that is, in a direction parallel to the applied bolting force, usually in the magnitude of twenty-five thousand pounds, which is evenly distributed over all cell walls by cover plates as will presently appear. The individual cells forming the grid contact each other in rows for a lateral distance substantially equal to the length of the bar, and in a vertical distance substantially equal to the height of the bar.

All rail joint bars vary in height according to the fishing distance between the head and foot of the bar. Therefore, from one to four rows of cell units may be used vertically according to bar specifications.

The cells 1, whether of the cross sectional configuration shown in FIG. 4 or in FIG. 5, are preferably made to have an internal diameter to receive a tubular bolt insulating ferrule 2 at the location of the bolt holes in the bar. However, it will be understood that the cellular core may have cells of smaller diameter, in which event, openings to receive the ferrules may be bored, drilled, or otherwise formed to conveniently receive the insulating sleeves or ferrules for the bolts. The ferrules may be of hard fiber or pre-formed plastic material to maintain the bolt shanks insulated from the metal core.

The outer edge portions of the cells are clamped between suitable force distributing plates 3 and 4 such, for example, as shown in FIGS. 2 and 6.

As illustrated in said FIGS. 2 and 3, the plates 3 and 4 include vertical webs having bolt holes and also have their upper and lower portions 3a–3b and 4a–4b respectively bent into angular cross sectional configurations corresponding more or less to the physical characteristics of the vertical cross sectional profile of the head and foot of the joint bar.

As shown, the inner plate 3 may have its upper flange portion 3a made to conform to the general inclination of the underside of the rail head while its bottom flange 3b is formed on an angle compatible with the upper face of the base flange of the rail, and its mating outer plate 4 has its upper flange 5 and lower flange 6 shaped to conform, for example, to what would be the upper and lower outwardly extending flanges of the completed bar.

The plates 7 and 8 have the top and bottom edges 7a and 8a curved inwardly to aid in holding plastic insulating material poured in the cells, and about the insulating ferrules.

Also, these plates become bonded to the outer edge portions of the cells so that bolt pressure is distributed both longitudinally and radially throughout the entire reinforcing unit comprising the cells and the plates.

Thus, it will be seen that with the described arrangement it is possible to make and reinforce an enveloping plastic coating to conform with the compressive and vertical strength structural features of a bar designed to fit the requirements of insulated joint bars for use with rails within the range of 85# to 155# to the yard.

While either type of cell is useful, nevertheless, it will be understood that their abutting outer surfaces may be secured together to provide a stable grid that will also materially absorb and transmit, in all directions, the pressure applied by the bolts to uniformly and firmly hold the joint bar in the fishing space of the rail.

The cells are preferably filled with thermosetting resins which function to suit the loading and pressure forces imposed on the bars by the bolts. That is to say, the structural adhesive may be epoxies; epoxy-phenolics; epoxy-polysulphides; epoxy polyamides; cyanoacrylates; epoxysilicones; phenolic neoprenes; phenolic-nitriles; phenolicvinyls; and polyurethanes. The latter would be a good insulating material for the outer covering of all surfaces of the core, but may also be used to fill the cells. The foregoing are examples of materials that may be used, but do not rule out others made in the future that have the desired characteristics.

The cells may be made of metal or one or more low pressure thermosetting resins and thermoplastics. In the latter case, that is where the cells are not made of metal, no bolt insulating sleeves would be required.

The core, in lending itself to entrap synthetic material, becomes, in effect, a solid member. Thus, it is within the scope of the invention to initially provide a solid core of synthetic material or a solid piece of metal of predetermined length and thickness which serves as a support for the bar flange forming members, preferably pressed from metal of suitable thickness to attain the desired section modulus.

I claim:

1. An insulated rail joint bar, including,
head, web and foot portions,
said web having a core of cellular formation,
and said head, web and foot portions encapsulated by a moldable and settable insulating material.

2. An insulated rail joint bar, according to claim 1, wherein, the core is provided at one side with a pressure distributing plate.

3. An insulated rail joint bar, according to claim 1, wherein, the core is provided at opposite sides with pressure distributing plates whose top and bottom edge portions conform to the predetermined cross-sectional profile of the head and foot portions of the joint bar.

4. An insulated rail joint bar, according to claim 1, wherein, the core is provided at opposite sides with pressure distributing plates having top and bottom edge portions bent inwardly toward each other.

5. An insulated rail joint bar, according to claim 1, wherein, said core extends beyond the vertical height of said web into said head and foot portions.

6. An insulated rail joint bar, according to claim 1, wherein, the axes of the cells of said core are horizontally disposed and perpendicular to the outer face of said bar web.

7. An insulated rail joint bar adapted to fit into the fishing portion of adjacent rail ends, comprising, a core having bolt holes, an inner plate having a middle area engaging the core and also having upper and lower flanges each having a portion inclined relative to said middle area to a degree substantially equal to the angle of the underside of the related rail heads, an outer plate having a middle area engaging the outer face of the core and also having upper and lower flanges outwardly offset from the said outer face of the core and having a cross-sectional profile to provide ribs tending to resist downward pressure on the bar, said inner and outer plates also having bolt holes to register with each other and the bolt holes in the core, and said core and flanges encapsulated with an insulating cover.

8. An insulated rail joint bar comprising, head and foot portions and a web, an encapsulating external cover and an interior reinforcing and bolt force distributing core located in the web, said core including, a cellular structure having the axes of its cells perpendicular to the outer bolting face of the bar, inner and outer plates at opposite sides of said structure and having upper and lower flange portions pressed out of the plates to reinforce and stiffen the core and also distribute bolting forces through the web to the head and foot of the bar, said core and plates having bolt hole receiving openings.

References Cited by the Examiner

UNITED STATES PATENTS

| 2,744,042 | 5/1956 | Pace | 105—423 |
| 3,071,216 | 1/1963 | Jones et al. | 105—423 |
| 3,086,899 | 4/1963 | Smith et al. | 105—423 |

ARTHUR L. LA POINT, *Primary Examiner.*

R. A. BERTSCH, *Assistant Examiner.*